Figure 1:
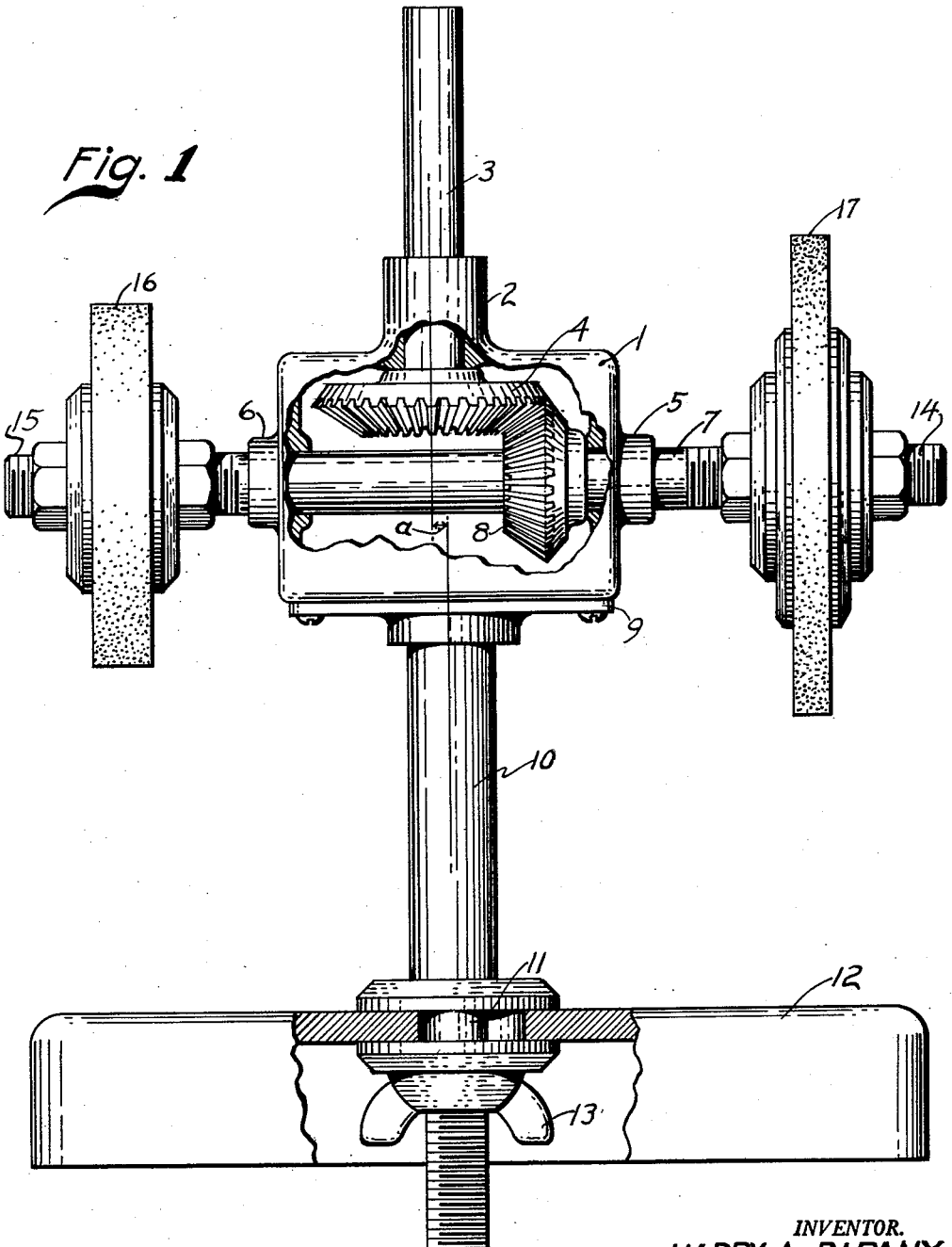

Dec. 17, 1957     H. A. BARANY     2,816,405
ATTACHMENT FOR DRILL PRESS
Filed Feb. 9, 1956

INVENTOR.
HARRY A. BARANY
BY
ATTORNEY

United States Patent Office 2,816,405
Patented Dec. 17, 1957

2,816,405

ATTACHMENT FOR DRILL PRESS

Harry A. Barany, Berkeley, Mo.

Application February 9, 1956, Serial No. 564,444

1 Claim. (Cl. 51—241)

This invention applies to an attachment for an ordinary drill press, more particularly to an attachment such as is used in home workshops whereby a rotary tool such as a grinding wheel or the like may be mounted for use and driven by the spindle of the drill press.

An object of this invention is to provide a device of very simple structure whereby grinding wheels or buffing wheels may be mounted in a convenient position for use and connected so as to be driven by the drill press.

Another object is to provide such a device which may be set in different positions according to the conditions under which they are used.

Generally stated, the device comprises a gear housing in which is journaled a vertical spindle and a horizontal shaft. The two are connected by bevel gears within the housing so that the shaft may be driven by the spindle. The spindle is so positioned and made of such size that it may be clamped in the chuck of the drill press. The ends of the horizontal shaft are threaded or otherwise provided for mounting a grinder wheel or buffing wheel on either end. A rigid support in the form of a column is fixed to the bottom of the gear housing, and its lower end is provided with a shank which may be passed through a perforation in the table of the drill press and threaded so as to be rigidly attachable to said table.

A preferred embodiment of this invention is illustrated in the accompanying drawing, which represents a front view in elevation of a device embodying this invention, and mounted on a drill press table.

The device comprises a housing 1 provided with a bearing boss 2 in which a vertical spindle 3 is journaled. Said spindle has mounted on its lower end within the housing 1 a bevel gear 4. The housing also laterally extending bearing bosses 5 and 6 in which is journaled a horizontal shaft 7. This shaft has mounted thereon a bevel gear 8 meshing with the gear 4 to provide a driving connection between the spindle 3 and the shaft 7.

The bottom of the housing 1 is closed by a plate 9 to which is rigidly attached a vertical column 10. This column has a reduced shank 11 which may be passed through a perforation in the table 12 of the drill press. The shank may be threaded to receive a suitable nut 13 for clamping it to said table.

The ends of the shaft 7 may be provided with threads 14 and 15 respectively. These may be one a right hand thread and the other a left hand thread, in accordance with the usual practice for mounting grinding wheels on the opposite ends of the same shaft. If desired, a buffing wheel, such as indicated at 16, may be mounted on one end and a grinder 17 on the other.

In use, this device is mounted as shown and described and the chuck of the drill press is brought down to receive the spindle 3, which is then securely clamped in said chuck. When the nut 13 is tightened, the entire device is rigidly supported and the shaft 7 is driven when the drill press is started. The wheels 16 and 17 are thus supported in a convenient position for performing the operations required of them. If desired, suitable rests or supports may be mounted on the table 12, in such position relatively to one of the operating members such as the wheel 17 so as to provide a support or holding means for the work.

It will be noted that this device provides a convenient form of grinder which is of simple construction so as to be inexpensive to make, and which can be very quickly mounted and dismounted with respect to the drill press. In the embodiment shown, the column 10 is attached to the table 12 with its axis slightly offset from that of the spindle 3, as indicated at *a*, in order to minimize any tendency for the fixture as a whole to rotate about the spindle axis when a load is put upon the shaft 7.

Various changes may be made in the details of construction, within the scope of the appended claims, without departing from the spirit of this invention. Parts of the invention may be used without the whole and improvements may be added while retaining some or all of the advantages of the invention.

I claim:

An attachment for a drill press having a chuck and a table, comprising a housing having journals in the walls thereof, a vertical spindle and a horizontal shaft mounted in said journals and driving connections between said spindle and shaft, the ends of said shaft being adapted for mounting grinding and buffing elements thereon, said spindle being adapted to be engaged by said chuck of the drill press to be driven thereby, a vertical supporting column fixedly attached to the bottom side of said housing on an axis offset from that of said spindle and extending downwardly from said housing, and means carried by said column and adapted to secure same to the table.

References Cited in the file of this patent

UNITED STATES PATENTS

| | | |
|---|---|---|
| 1,549,241 | White | Aug. 11, 1925 |
| 1,628,975 | Hawkins | May 17, 1927 |
| 1,785,065 | Aborn | Dec. 16, 1930 |
| 2,076,998 | Martindale | Apr. 13, 1937 |
| 2,431,939 | Johnson | Dec. 2, 1947 |